United States Patent [19]
Olivotti

[11] Patent Number: 4,825,845
[45] Date of Patent: May 2, 1989

[54] APPARATUS AND COOKING METHOD FOR BARBECUEING WITH WOOD AND CARBON EMBERS; ODORLESS, SMOKELESS, DECORATIVE

[76] Inventor: Elia Olivotti, V.le F.lli Bandiera, 13, Treviso, Italy

[21] Appl. No.: 62,216

[22] Filed: Jun. 15, 1987

[30] Foreign Application Priority Data

Jun. 27, 1986 [IT] Italy .................. 59387/86[U]

[51] Int. Cl.⁴ .................. F24B 5/00; F24B 5/08; F24B 1/182
[52] U.S. Cl. .................. 126/15 R; 126/12; 126/13; 126/18; 126/77; 126/25 A; 126/191; 126/193; 126/243; 126/244; 126/245; 126/337 R; 126/506
[58] Field of Search .................. 126/11, 12, 13, 14, 126/15 R, 126, 18, 25 A, 1 AD, 137, 143, 243, 191, 193, 41 B, 244, 338, 337 R, 245; 110/166

[56] References Cited

U.S. PATENT DOCUMENTS

| | | | |
|---|---|---|---|
| 4,980 | 0/1846 | Russell | 126/25 A |
| 83,679 | 11/1868 | Wilks | 126/1 D |
| 266,800 | 4/1880 | Smith | 110/166 |
| 477,811 | 6/1892 | Molloy | 126/243 |
| 737,785 | 9/1903 | Seeds | 126/17 |
| 762,588 | 6/1904 | Jackson | 126/18 X |
| 902,724 | 11/1908 | Giovanna | 126/14 X |
| 3,034,494 | 5/1962 | Bryan | 126/137 |
| 4,182,302 | 1/1980 | Bruce et al. | 126/4 |
| 4,574,773 | 3/1986 | Moughamian | 126/126 X |

FOREIGN PATENT DOCUMENTS

| | | | |
|---|---|---|---|
| 58627 | 8/1982 | European Pat. Off. | 126/193 |
| 887599 | 11/1943 | France | 126/4 |
| 2546611 | 11/1984 | France | 126/191 |
| 122508 | 1/1919 | United Kingdom | 126/126 |
| 170793 | 11/1921 | United Kingdom | 126/4 |
| 234178 | 5/1925 | United Kingdom | 126/126 |

Primary Examiner—Samuel Scott
Assistant Examiner—Carl D. Price
Attorney, Agent, or Firm—Notaro & Michalos

[57] ABSTRACT

A combustion apparatus for burning wood or coal comprises a cooking enclosure mounted above a combustion chamber enclosure. An upper space of the combustion chamber enclosure contains a combustion chamber having a floor and walls made of refractory material. The combustion chamber is closed all around except for the top. A plurality of primary air holes are provided in the floor of the combustion chamber and a plurality of secondary air holes are provided through the combustion chamber enclosure at the level of the open top of the combustion chamber. An ash pan is mounted for sliding into the combustion chamber enclosure below the combustion chamber to act as a regulator for air entering the combustion chamber enclosure. A cooking plate is pivotally mounted in the cooking enclosure so that it can be lowered into a cooking position over the open top of the combustion chamber. Exhaust gases from the combustion chamber leave the chamber through a space between a rear edge of the lowered cooking plate and a rear wall of the cooking enclosure. A transparent door closes the otherwise open front wall of the cooking enclosure. This door can be lifted for access to the cooking space or lowered to confine exhaust gases and cooking odors to the interior of the cooking space. A flue is provided at the top of the cooking space for venting the exhaust gases and cooking odors.

9 Claims, 4 Drawing Sheets

APPARATUS AND COOKING METHOD FOR BARBECUEING WITH WOOD AND CARBON EMBERS; ODORLESS, SMOKELESS, DECORATIVE

FIELD AND BACKGROUND OF THE INVENTION

The present invention relates in general to wood and coal burning stoves and barbecues, and, in particular, to a new and useful combustion apparatus which has a front wall made of transparent material that can be raised, the apparatus being provided for burning wood embers or other solid fuel and for cooking foods in a variety of ways.

Barbecue cooking is universally preferred, both for dietetic reasons and because of the flavor it imparts to food. Up until now, barbecue cooking has been carried out with primitive techniques which have various disadvantages. It is difficult to light wood or coal that is commonly used to form glowing embers, either for cooking or for use in a fireplace. The lighting procedure is generally slow and smoky. This is especially true when lighting wood that is not completely dry. Fans and bellows are often used to aid in the lighting procedure. This produces additional smoke which, upon leaving the fireplace through the chimney, is emitted into the atmosphere. Some smoke condenses on the inside of the chimney, due to imperfect combustion, leaving greasy deposits of soot which must eventually be cleaned.

Up to now, it has also been impossible to barbecue meat or fish indoors, due to the emission of odors and smoke. It is also impractical to barbecue foods in restaurants using wood embers because of the long time it takes to form the embers and the large quantity of embers needed for cooking in a restaurant. One technique is to place wood on a cage and then light the wood to form embers. Embers are then removed, little by little, as they are needed for barbecuing. Since the embers give off heat in an uneven manner, that is, excessive heat being given off initially with the heat then tapering off, constant attention is required when cooking with embers. Meat being barbecued must be turned repeatedly to avoid burning because of fat dripping from the meat onto the embers. This provokes the issuance of flames from the embers. The additional heat produced by these flames is not good for the cooking process.

When the embers are not properly lit, smoke is also given off which has a negative impact on the taste of the food being barbecued. Often, in place of wood embers, it is necessary to utilize a gas flame in conjunction with blocks of volcanic stone for barbecue cooking. Fats dripping from the food strike the heated volcanic stones causing high flames and possible damage to the food being cooked. Flames and combustion products thus permeate the food. The issuance of flames and smoke also require the use of mechanically vented hood to remove smoke and vapors.

Another disadvantage of prior barbecuing methods is that embers may jump from the combustion area of the barbecue, thus posing a danger. Heat is also emitted in an uncontrolled fashion to the ambient atmosphere. Due to the aspiration of air through the hood or flue of a barbecue, cold currents of air are also induced near floor level. This makes it necessary to close the flue as soon as possible after combustion has been completed.

Another disadvantage of prior barbecue methods is in how the flowing embers are formed. Whether the wood is initially placed on andirons or in a cage, considerable amounts of wood must be consumed until embers appropriate for cooking are produced. A fire which is too small does not form enough embers for complete cooking so that near the end of the cooking process, carbon deposits are formed in the barbecue apparatus. A grill which may be used for cooking is also encrusted with such deposits requiring a lengthy cleaning process. Cleaning is also required for gas and electric ovens because of deposited fats which have dripped from the foods being cooked.

SUMMARY OF THE INVENTION

The present invention comprises a combustion apparatus which seeks to solve many of the problems listed above. The combustion apparatus of the invention is structured so as to eliminate smoke and odors, both in the area of the combustion apparatus and in the outside atmosphere to which products of the combustion are discharged. Because of even burning of glowing embers in the combustion apparatus of the invention, constant attention of a cook is not required during the cooking process. Browning of foods can be achieved without burning and consumption of wood is reduced by 50%. The wood can also be quickly lit to produce glowing embers, thus rendering it practical to cook with wood embers indoors.

The combustion apparatus of the present invention comprises a main oven enclosure having an open front wall which can be closed by a transparent door. A combustion chamber is provided under the main oven enclosure. The combustion chamber includes a floor having a plurality of primary air openings for admitting primary combustion air. Secondary air openings for provided near the top of the combustion chamber for admitting secondary combustion air. The combustion chamber is provided in the upper portion of a combustion chamber enclosure. A front wall of the combustion chamber enclosure includes a large opening for receiving an ash pan. The ash pan can be moved into or out of the large opening to regulate the draft of air entering the combustion chamber through the primary air openings.

A barbecue grill is provided in the main oven enclosure with a raising apparatus which can be activated to raise or lower the grill.

According to the present invention, lighting of the solid fuel is virtually immediate and does not require the use of fans or bellows whether the solid fuel is wood or coal. Smoke emitted during the lighting process is virtually eliminated, both inside and outside of the combustion apparatus. This reduces deposits of soot on inside surfaces of the combustion apparatus due to a more complete burning of the fuel. Even wood which is not completely dry can be used as an effective fuel without emitting large amounts of smoke.

Wood embers can be produced in as little as twenty to thirty minutes, depending on the amount of wood to be lit, and coal can be reduced to glowing embers in as little as ten minutes.

The combustion apparatus of the invention can also be used in a kitchen without requiring an exhaust hood. It is also unnecessary to check the combustion chamber since it may be loaded only once for the creation of uniform embers without formation of residues. In addition, the embers last longer and produce more uniform heat for better cooking characteristics. Because of the adjustable height of the grill, the cooking of a chicken, for example, can be conducted almost automatically. The rate of burning of the embers can be closely controlled from outside the apparatus. Grills being made of relatively thin rods can also be used which are free of any gutters for accumulating dripping fats. This results in a more complete browning of the food and also avoids sudden flames which are provoked by the sudden dripping of fats onto the flowing embers.

The use of the clear door also eliminates the escape of heat which would pose a discomfort to the person cooking the food.

According to the present invention, only the air needed for combustion is aspirated into the apparatus. This reduces the overall draft of air through the apparatus, thus reducing the formation of cold air currents at floor level. Odors and smoke from cooking are also more effectively eliminated as are the blackening effects of soot. The construction of the combustion apparatus also eliminates the possibility that embers will jump from the combustion area. This is provided by enclosing the combustion chambers on all sides except the top.

The invention also includes a cooking plate which can be pivoted down over the open top of the combustion chamber for providing a kitchen range type structure for cooking. Movement of the cooking plate is provided by a lever which is accessible from outside the apparatus. Cooking can thus be performed in pans or pots on the cooking plate without the discharge of smells or smoke from the combustion chamber. This closing off of the combustion chamber also advances distillation and carbonization of the wood for a more complete combustion process. The rear edge of the cooking plate is spaced from the rear wall of the main oven enclosure to provide free passage of combustion products around the cooking plate.

In the cooking process, once the wood has been lit, the ash pan is closed. Combustion continues by virtue of secondary combustion air provided through the secondary air openings. This reduces the consumption rate of the wood and the resulting glowing embers by 50%.

This results from the shape of the combustion chamber and the provision of both primary and secondary combustion air openings. The enclosure of the solid fuel in the combustion chamber also enhances a more complete burning of the fuel which is not often the case when the fuel is heaped upon the two andirons of a fireplace.

The uneven dispersion of heat is thus reduced and the flowing embers last longer and produce more constant heat which is advantageous for cooking.

BRIEF DESCRIPTION OF THE DRAWINGS

In the drawings:

FIG. 3A is a partial sectional view showing the operation of the door and counter weight structure for closing the front wall of the apparatus;

DETAILED DESCRIPTION

Figure 1:
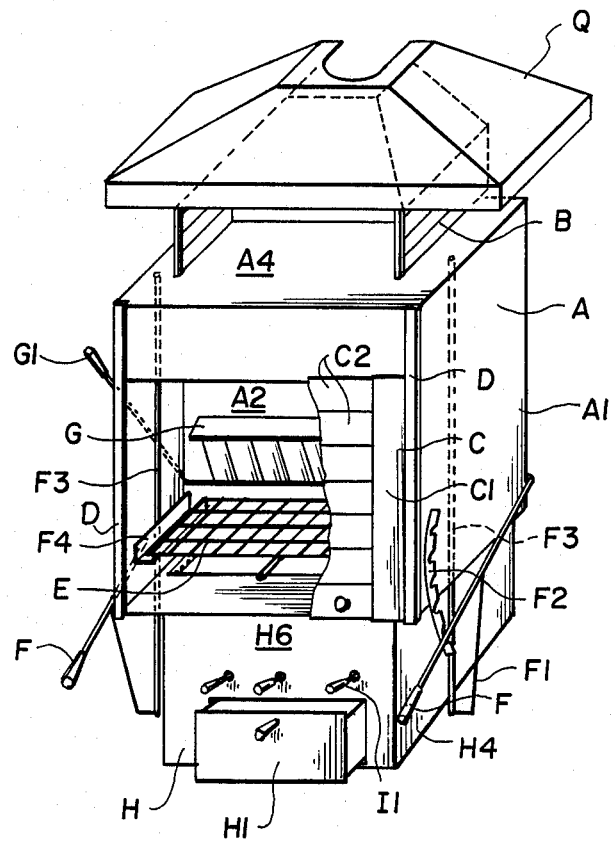
FIG. 1 is a front perspective view of the combustion apparatus in accordance with the present invention.

Referring to the drawings in particular, a purely illustrative example of the invention as illustrated in FIG. 1 comprises a main oven enclosure A having side walls A1, a rear wall A2 and a top wall A4, defining a main cooking space therein. The cooking space is provided at a height which is convenient for cooking. To this end, the oven enclosure A is supported on a combustion chamber enclosure H. Combustion chamber enclosure H has side walls H4, a front wall H6 and a rear wall, not visible in FIG. 1. A large opening is provided in the lower part of the front wall H6 for receiving an ash pan H1 which is in the form of a drawer.

Figure 3:
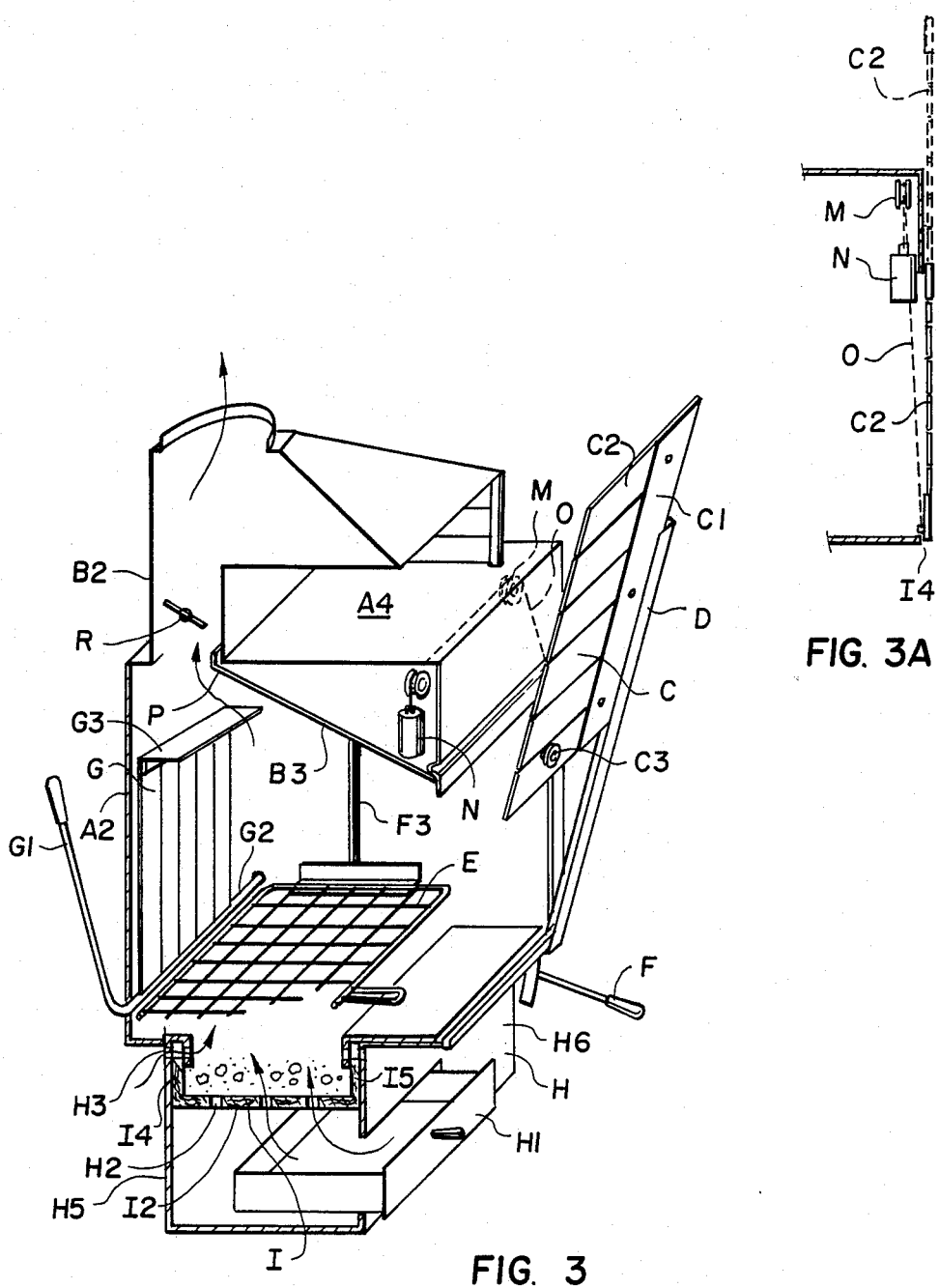
FIG. 3 is a perspective side view of the apparatus of FIG. 1, with portions removed to reveal interior structures.

The front wall of main oven enclosure A is closed by a door C made at least in part of transparent thermal crystal or ordinary glass strips C2 which extend horizontally and are spaced from each other. Glass strips C2 are fixed on opposite sides to side frames C1. Side frames C1 are in turn mounted for vertical sliding movement in guide frames D which, as shown in FIG. 3, are mounted for pivotal movement to the bottom edge of the oven enclosure A. In normal use, the guide frames D extend vertically in front of enclosure A.

A secondary oven enclosure B is mounted over the top wall A4 of enclosure A and defines an auxiliary cooking space on the top wall for additional cooking.

A cooking plate G is pivotally mounted in enclosure A. In addition, a barbecue grill E is provided in enclosure A. Grill E is supported on opposite edges by grill support rails F4, one of which is visible in FIG. 1. Support rail F4 is fixed to an inside connecting rod F3. Inside connecting rod F3 is fixed to an outside connecting rod F1, which, in turn, is connected to a grill lever F. Grill levers F, which are pivotally connected to the outside of oven enclosure A, can be raised and lowered to raise and lower grill E inside the enclosure. Levers F can be held in any of a plurality of raised positions by engaging them in the recesses or steps of a pair of stop rails F2 connected to either side of the enclosure A.

Figure 2:
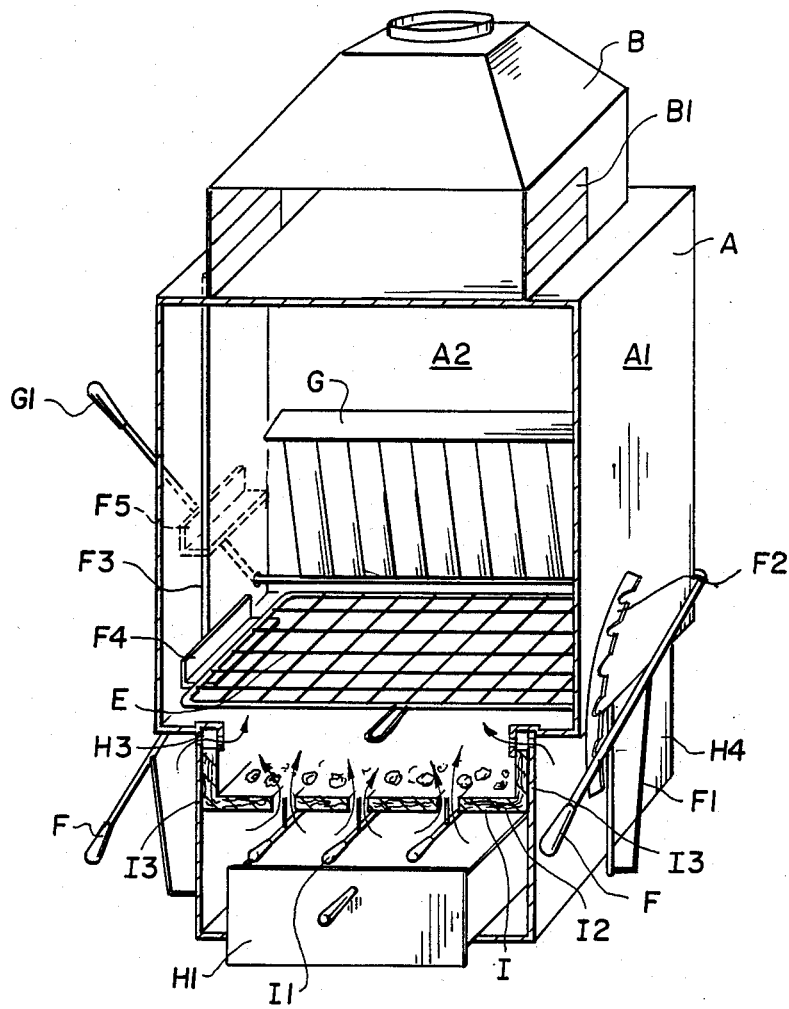
FIG. 2 is a view similar to FIG. 1 with certain parts of the apparatus removed to reveal interior structures.

Referring now to FIGS. 2 and 3, a combustion chamber I is positioned in an upper part of the combustion space defined by the combustion chamber enclosure H. Combustion chamber I comprises a floor I2, a pair of side walls I3, a rear wall I4 and a front wall I5, which are connected and extend upwardly from the floor I2. The walls of the combustion chamber I are all made of refractory material. A plurality of slots or openings H2 are provided through the floor I2 to form primary air openings for admitting primary air as shown by the arrows in FIGS. 2 and 3. The draft is controlled by moving ash pan H1 in the opening of front wall H6. Combustion products rise through the cooking space defined by oven enclosure A and out through a flue enclosure B2. The draft can also be regulated by a draft regulator R in the flue formed by flue enclosure B2. Flue enclosure B2 extends over the top of the auxiliary food space above top wall A4 for heating that space.

Heat and combustion products are kept away from the door C because of the spaces between the glass strips C2. This causes the inflow of air that tends to deflect the combustion products away from the door. This tends to keep the glass clear and clean.

To aid in raising and lowering the glass door and, as best shown in FIGS. 3 and 3A, a cable O is connected near a lower edge of the door and extends over a pulley M and to a counterweight N. A handle C3 can be used to slide the door upwardly on its guide rails D. This upward movement is aided by the counter weight N. To protect the pulley and cable, at least in the lowered condition of the door, and also to aid deflection of the exhaust products away from the door and into the flue, a deflector plate B3 extends at an angle near the top of the cooking space, from the upper edge of the door in its lowered position, to the flue.

The fact that the grill E and door C can be raised permits easy access to the open top of the combustion chamber I for loading the chamber with fuel.

The fuel can then be lit to start combustion. The door C is then lowered.

Flow of primary air through primary air openings H2 is induced by opening ash pan H1. This quickly produces glowing embers which are appropriate for cooking. Once the glowing embers are produced, ash pan H1 is closed so that only secondary air through secondary air openings H3, near the level of the open top of the combustion chamber is provided for combustion.

In this way, the combustion chamber is substantially enclosed, both during initial lighting and during the formation and use of the flowing embers. This reduces the amount of smoke produced and advances more complete combustion to avoid smoke or greasy soot.

It is noted that the large draft produced when the ash pan H1 is opened, both through the openings H2 and the additional air through the openings H3, produces a much quicker lighting of the wood and more complete combustion.

Cleaning of the slot-shaped primary air openings H2 is possible by moving cleaners I1 which each extend from the front wall H6 of the enclosure H. Inside the enclosure H, the cleaners I1 have tines which extend up into the slots as shown in FIG. 2.

Because of the construction of the combustion chamber and surrounding structures, a piece of wood burns with a bright smokeless flame. The combustion is, in effect, incandescent.

The enclosures are made of steel plate which may be welded together and include secondary internal protection also formed by steel plates in the form of strips which guard against deformation of the outer steel plates.

The refractory material of the combustion chamber I, which, for example, may be clay, also causes the embers to yield heat in a more uniform manner. This avoids burning of the foods to be cooked and enhances a more uniform browning of the foods. Grill E can also be raised to a proper level for even cooking. A chicken, for example, can be cooked virtually automatically by raising the grill to its highest level. The chicken may be cooked for twenty to twenty-five minutes. The grill is then lowered for an additional twenty to twenty-five minutes of cooking, that results in perfect browning without burning.

Even cooking is further enhanced by keeping the glass door closed during the cooking operation.

Three to four kilos of wood supplied at one time to the combustion chamber provide forty to fifty minutes of cooking heat, when cooking is performed in a saucepan on the cooking plate G, when in its lowered position. Other cooking may proceed again without emission of odors for another fifty to sixty minutes on the embers, after the plate has been raised. Coal can be added to prolong cooking even further. Smoke from cooking meat is destroyed by heat of the embers together with the high internal temperature of the oven enclosure. All residuals, gases and odors are discharged through the flue. This makes it possible to use the combustion apparatus of the invention in a dining room.

Figure 5:
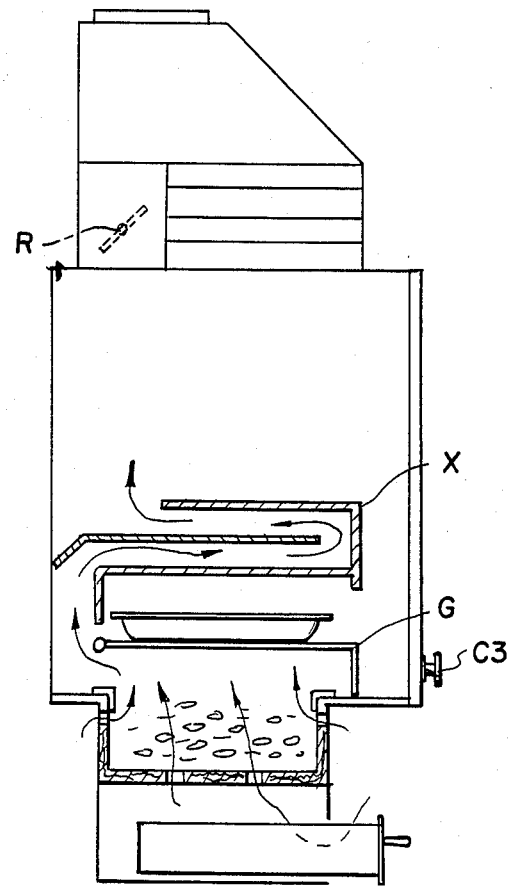
FIG. 5 is a view similar to FIG. 4, showing a mode of cooking with top browning.

The combustion apparatus of the present invention can also be used to brown bechamel sauces, lasagna and pizzas by directing heat down onto the food from above. To this end, and, as best shown in FIG. 5, a pan containing the food is placed on the cooking plate G when in a lowered position. A set of baffle plates X is then positioned in the enclosure A to form a horizontal chimney. A lower plate X1 is provided above the cooking plate G. Spaced above plate X1 is an upper plate X2 with an intermediate plate X3 there between. The rear edge of the lower plate X1 is provided with a rear skirt X4, which extends almost to the rear edge G2 of the plate G, which is spaced from the rear wall A2 of the enclosure A. This forms a local flue for all exhaust products from the combustion chamber I. The hot exhaust products then pass horizontally between plates X1, X2 and X3, up through the cooking space and pass the draft regulator R. The hot gases cause heating of plate X1 which produces downward radiant heating onto the top of the food being supported on cooking plate G.

To increase the enclosure of combustion chamber I, cooking plate G has a front skirt G3 extending downwardly from a front edge of the plate, which rests against a floor ledge A3 that extends around the open top of the combustion chamber I. Floor ledge A3 also helps space the combustion chamber from the door C of the enclosure A.

Figure 4:
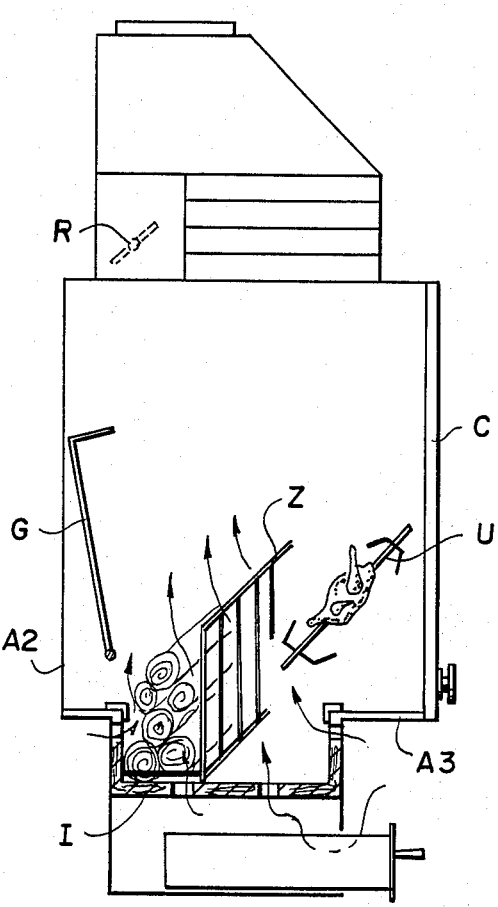
FIG. 4 is a simplified side sectional view of the apparatus of FIG. 1, illustrating a mode of cooking with a rotary spit.

FIG. 4 shows another mode of cooking which utilizes a trellis Z which extends upwardly from the floor of the combustion chamber I and which retains logs shown in FIG. 4. A spit U is then mounted for rotation in the cooking space and rotated by conventional means. Heat from the burning logs thus cooks any food on the spit U.

I claim:

1. A combustion apparatus for burning solid fuel and for cooking, comprising:

a combustion chamber enclosure having side walls and a rear wall defining a lower space;

a combustion chamber in an upper part of said lower space, said combustion chamber having a floor with side wall, a rear wall and a front wall connected to and extending upwardly from said floor and defining a closed combustion space with an open top for receiving solid fuel, said floor, side walls, rear walls and front wall of said combustion chamber all being made of refractory material, said floor including a plurality of primary combustion air openings there through, for receiving primary combustion air from a lower part of said lower space, said combustion chamber enclosure, including a plurality of secondary air openings there through, at approximately the level of said open top of said combustion chamber;

a main oven enclosure connected to and extending above said combustion chamber enclosure, said main oven enclosure having side walls, a rear wall and a top wall connected to each other for defining a main cooking space above said combustion space; said main cooking space communicating with said combustion chamber open top;

a flue enclosure connected to and extending above said top wall of said main oven enclosure for defining a flue communicating with said main cooking space for exhausting combustion and cooking gases from said main cooking space;

a cooking plate pivotally mounted to said main oven enclosure for pivotal movement in said main cooking space from a lowered position substantially covering said open top of said combustion chamber for cooking on said cooking plate to a raised position extending upwardly in said main cooking space, said cooking plate having a rear edge spaced in said closed position from said rear wall of said main oven enclosure for permitting flow of exhaust gases from said combustion chamber between said rear edge and said rear wall of said main oven enclosure with said cooking plate in said lowered position;

a grill in said main cooking space above said open top of said combustion chamber;

grill raising means connected to said grill for raising and lowering said grill above said open top of said combustion chamber;

a door made at least partly of transparent material slidably mounted to said main oven enclosure for opening and closing a front opening of said main oven enclosure between said side walls of said main oven enclosure;

an auxiliary oven enclosure connected to said flue enclosure and positioned over said top wall of said main oven enclosure for defining an auxiliary cooking space on said top wall of said main oven enclosure; and baffle plate means removably mounted to said main oven enclosure in said main cooking space above said cooking plate in said lowered position of said cooking plate, for defining a horizontal chimney for exhaust gases from said combustion chamber for radiating heat downwardly toward said cooking plate in said lowered position.

2. A combustion chamber according to claim 1, wherein said baffle plate means comprises a lower plate spaced above said cooking plate with said cooking plate in said lowered position, an upper plate spaced above said lower plate and an intermediate plate spaced between said upper and said lower plates, said lower plate having a rear edge and a rear skirt extending downwardly from said rear edge of said lower plate to said rear edge of said cooking plate for defining an entry for exhaust gases from said combustion chamber to said horizontal chimney between said upper, lower and intermediate plates.

3. A combustion apparatus for burning solid fuel and for cooking, comprising:

a combustion chamber enclosure having side walls and a rear wall defining a lower space;

a combustion chamber in an upper part of said lower space, said combustion chamber having a floor with side wall, a rear wall and a front wall connected to and extending upwardly from said floor and defining a closed combustion space with an open top for receiving solid fuel, said floor, side walls, rear walls and front wall of said combustion chamber all being made of refractory material, said floor including a plurality of primary combustion air openings there through, for receiving primary combustion air from a lower part of said lower space, said combustion chamber enclosure, including a plurality of secondary air openings there through, at approximately the level of said open top of said combustion chamber;

a main oven enclosure connected to and extending above said combustion chamber enclosure, said main oven enclosure having side walls, a rear wall and a top wall connected to each other for defining a main cooking space above said combustion space; said main cooking space communicating with said combustion chamber open top;

a flue enclosure connected to and extending above said top wall of said main oven enclosure for defining a flue communicating with said main cooking space for exhausting combustion and cooking gases from said main cooking space;

a cooking plate pivotally mounted to said main oven enclosure for pivotal movement in said main cooking space from a lowered position substantially covering said open top of said combustion chamber for cooking on said cooking plate to a raised position extending upwardly in said main cooking space, said cooking plate having a rear edge spaced in said closed position from said rear wall of said main oven enclosure for permitting flow of exhaust gases from said combustion chamber between said rear edge and said rear wall of said main oven enclosure with said cooking plate in said lowered position;

a grill in said main cooking space above said open top of said combustion chamber;

grill raising means connected to said grill for raising and lowering said grill above said open top of said combustion chamber;

a door made at least partly of transparent material slidably mounted to said main oven enclosure for opening and closing a front opening of said main oven enclosure between said side walls of said main oven enclosure;

an auxiliary oven enclosure connected to said flue enclosure and positioned over said top wall of said main oven enclosure for defining an auxiliary cooking space on said top wall of said main oven enclosure; and baffle plate means moveably mounted to said main oven enclosure in said main main cooking space above said cooking plate in said lowered position of said cooking plate, for defining a horizontal chimney for exhaust gases from said combustion chamber for radiating heat downwardly toward said cooking plate in said lowered position.

said main oven enclosure includes a floor ledge extending at least partly around said open top of said combustion chamber, said cooking plate including a front edge spaced from said rear edge thereof and a front skirt extending downwardly from said front edge and extending into engagement with said floor ledge of said main oven enclosure with said cooking plate in said lowered position.

4. A combustion chamber according to claim 3, including a first lever connected to said cooking plate at said rear edge of said cooking plate, said first lever extending out of said main oven enclosure and being movable to pivot said cooking plate between its raised and lowered positions.

5. A combustion chamber according to claim 4, wherein said grill raising means comprises at least one second lever pivotally connected to said main oven enclosure, at least one support rail in said cooking space for supporting said grill, a connecting rod connected between said second lever and said support rail for raising and lowering said support rail with movement of said second lever and a stop rail connected to said main oven enclosure for engaging said second lever at a plurality of pivotal positions of said second lever to hold said grill at a plurality of levels above said combustion chamber.

6. A combustion apparatus according to claim 3, wherein said combustion chamber enclosure includes a front wall having a main opening therein and an ash pan moveably mounted in said main opening below said combustion chamber floor for movement in said opening of said combustion chamber enclosure front wall for regulating an amount of primary air available for said primary air openings.

7. A combustion apparatus according to claim 6, including a pair of guide frames pivotally connected to said main oven enclosure, said door being slidably mounted for raising and lowering to said guide frames, said door comprising a plurality of spaced apart substantially parallel panes of thermal glass for covering said front wall of said main oven enclosure and for admitting at least some air into said main cooking space between said strips.

8. A combustion apparatus according to claim 7, including at least one counterweight operatively connected to said door for facilitating raising and lowering of said door on said guide frames.

9. A combustion apparatus according to claim 8, wherein said at least one counterweight is positioned in said main oven enclosure, said main oven enclosure including a deflector plate below said counterweight and inclined toward said flue for deflecting exhaust gases from said door toward said flue with said door in its lowered position.

* * * * *